(12) United States Patent
Palombini et al.

(10) Patent No.: US 11,618,328 B1
(45) Date of Patent: Apr. 4, 2023

(54) METHODS AND SYSTEMS FOR CHARGING AN ELECTRIC AIRCRAFT INCLUDING A VERTICAL CABLE ARRANGEMENT

(71) Applicant: BETA AIR, LLC, South Burlington, VT (US)

(72) Inventors: John Charles Palombini, South Burlington, VT (US); Skye Carapetyan, South Burlington, VT (US); Richard Donnelly, South Burlington, VT (US); Jake Pill, South Burlington, VT (US); Ed Hall, South Burlington, VT (US); Cole William Hanson, Burlington, VT (US); James Whitehill, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/736,619

(22) Filed: May 4, 2022

(51) Int. Cl.
*B60L 53/30* (2019.01)
*B60L 53/16* (2019.01)
(Continued)

(52) U.S. Cl.
CPC ............... *B60L 53/30* (2019.02); *B60L 50/66* (2019.02); *B60L 53/16* (2019.02); *B64D 27/24* (2013.01); *B60L 2200/10* (2013.01)

(58) Field of Classification Search
CPC ...................................................... B60L 53/30
(Continued)

(56) References Cited

U.S. PATENT DOCUMENTS 2,565,273 A   8/1951   Shuler et al.
4,161,682 A   7/1979   Corvette
(Continued)

FOREIGN PATENT DOCUMENTS

DE   102019124829   3/2021
DE   102019124829 A1   3/2021
(Continued)

OTHER PUBLICATIONS

N/A, EV Reel, Nov. 17, 2021.
(Continued)

*Primary Examiner* — Jerry D Robbins
(74) *Attorney, Agent, or Firm* — Caldwell Intellectual Property Law

(57) ABSTRACT

A system for charging an electric aircraft including a vertical cable arrangement, the system including a charger. The charger including an energy source, a charging cable electrically connected to the energy source, and a vertical cable arrangement. The vertical cable arrangement has a first cable arrangement position wherein the vertical cable arrangement is located at a first elevation, and has a second cable arrangement position, wherein the vertical cable arrangement is located at a second elevation, wherein the second elevation is greater than the first elevation. The charger also includes a lift connected to the vertical cable arrangement. The lift has a first lift position and a second lift position. When the lift is in the first lift position, the vertical cable arrangement is in the first cable arrangement position. When the lift is in the second lift position, the vertical cable arrangement is in the second cable arrangement position.

20 Claims, 11 Drawing Sheets

(51) Int. Cl.
  *B60L 50/60* (2019.01)
  *B64D 27/24* (2006.01)
(58) Field of Classification Search
  USPC .......................................................... 320/109
  See application file for complete search history.

(56) References Cited

U.S. PATENT DOCUMENTS

| | | | |
|---|---|---|---|
| 6,338,450 B1 | 1/2002 | Schwendinger | |
| 6,909,259 B2 | 6/2005 | Chung | |
| 8,058,841 B2 | 11/2011 | Chander et al. | |
| 9,073,439 B2 | 7/2015 | Brown et al. | |
| 9,172,232 B2 | 10/2015 | Kinomura et al. | |
| 9,365,116 B2 | 6/2016 | Staley et al. | |
| 9,457,674 B2 | 10/2016 | Bianco et al. | |
| 9,950,634 B2 | 4/2018 | Bianco et al. | |
| 10,720,766 B2 | 7/2020 | Krammer et al. | |
| 11,177,641 B1 | 11/2021 | Ebrahimi Afrouzi et al. | |
| 2013/0307477 A1* | 11/2013 | Reinschke | B60L 53/30 320/109 |
| 2014/0034382 A1 | 2/2014 | Mateski et al. | |
| 2015/0008878 A1* | 1/2015 | Mizuno | B65H 75/4415 320/109 |
| 2016/0121747 A1* | 5/2016 | Jefferies | B60L 53/16 320/109 |
| 2017/0129355 A1 | 5/2017 | Fournier et al. | |
| 2019/0214807 A1 | 7/2019 | Owens | |
| 2020/0324661 A1* | 10/2020 | Freeling-Wilkinson | B60L 53/18 |
| 2020/0354049 A1* | 11/2020 | Noppel | G05D 1/0088 |
| 2021/0053456 A1* | 2/2021 | Freeling-Wilkinson | B60L 53/35 |
| 2022/0281332 A1* | 9/2022 | Tsuchiya | B60L 53/20 |
| 2022/0305932 A1* | 9/2022 | Kinomura | B60L 53/31 |

FOREIGN PATENT DOCUMENTS

| | | |
|---|---|---|
| EP | 3819215 A1 | 5/2021 |
| EP | 3459785 B1 | 11/2021 |
| GB | 2572469 A1 | 10/2019 |
| KR | 102200439 B1 | 1/2021 |
| WO | 2019113143 | 6/2019 |

OTHER PUBLICATIONS

N/A, EvoCharge EvoReel, Nov. 17, 2021.
N/A, Chargeworks Charger, Nov. 17, 2021.
Tom Moloughney, Best Home EV Chargers for 2021, Jul. 9, 2021.

\* cited by examiner

METHODS AND SYSTEMS FOR CHARGING AN ELECTRIC AIRCRAFT INCLUDING A VERTICAL CABLE ARRANGEMENT

FIELD OF THE INVENTION

The present invention generally relates to the field of electric vehicle charging. In particular, the present invention is directed to methods and systems for charging an electric vehicle including a vertical cable arrangement

BACKGROUND

Charging electric vehicles can be an exhausting and frustrating endeavor. The charging cables can be frustrating to deal with. The charging cables can be heavy, and sometimes they can become tangled. This is particularly true for charging electric aircraft. In some cases, the charging cables for electric aircraft may be heavier and longer than those confronted for other electric vehicles. Additionally, cases where the electric vehicle is on a helipad, it can be tiresome to have to drag a charging cable up onto the landing surface from below the helipad. Existing solutions are not satisfactory.

SUMMARY OF THE DISCLOSURE

In an aspect, a system for charging an electric aircraft including a vertical cable arrangement, the system including a charger. The charger includes an energy source, a charging cable, wherein the charging cable is electrically connected to the energy source of the charger, and a vertical cable arrangement. The vertical cable arrangement includes at least a length of the charging cable, the vertical cable arrangement has a first cable arrangement position, wherein the vertical cable arrangement is located at a first elevation and the vertical cable arrangement has a second cable arrangement position, wherein the vertical cable arrangement is located at a second elevation, wherein the second elevation is greater than the first elevation. The charger also includes a lift, wherein the lift is connected to the vertical cable arrangement and the lift has a first lift position and a second lift position, wherein when the lift is in the first lift position, the vertical cable arrangement is in the first cable arrangement position and when the lift is in the second lift position, the vertical cable arrangement is in the second cable arrangement position.

In another aspect, a method for charging an electric aircraft including a vertical cable arrangement, the method including a step of raising, using a lift, a vertical cable arrangement from a first cable arrangement position to a second cable arrangement position. The step of raising, using a lift, a vertical cable arrangement from a first cable arrangement position to a second cable arrangement position, wherein a second elevation of the second cable arrangement position is greater than a first elevation of a first cable arrangement position, and the vertical cable arrangement includes at least a length of a charging cable, wherein the charging cable is electrically connected to a charger comprising an energy source. The method including a step of unstowing a charging cable such that the charging cable is in an unstowed configuration, wherein in a stowed configuration, the charging cable is wound around a cable reel, wherein the cable reel is rotatably mounted to the charger and in the unstowed configuration, at least a portion of the charging able is not wound around the cable reel. The method also including a step of coupling a charging connector to a charging port disposed on an electric vehicle, wherein the charging connector is electrically connected to the charging cable and the charging connector is configured to couple with a corresponding charging port on an electric aircraft. The method also including a step of uncoupling the charging connector from the charging port disposed on the electric vehicle. The method further including a step of stowing the charging cable such that the charging cable is in the stowed configuration.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for charging an electric aircraft. Particularly, aspects of the present disclosure are directed to systems and methods for charging an electric aircraft including a vertical cable arrangement.

Aspects of the present disclosure can be used to move the vertical cable arrangement between a first cable arrangement position and a second cable arrangement position. In some aspects, the first cable arrangement location and the second cable arrangement position may be in the same geographic location, but spaced apart by an elevation. In some aspects, a lift may be used to move the vertical cable arrangement between a first cable arrangement position and a second cable arrangement position.

Aspects of the present disclosure allow for the vertical cable arrangement to include a cable reel, wherein a charging cable may be wrapped round the cable reel. In certain aspects, the cable reel may be rotatably mounted such that it can rotate in a forward direction and a reverse direction. In some aspects, a rotator may be connected to the cable reel so that the rotator can cause the cable reel to rotate in a forward direction and a reverse direction. Exemplary embodiments illustrating aspects of the present disclosure are described below in the context of several specific examples.

Figure 1:
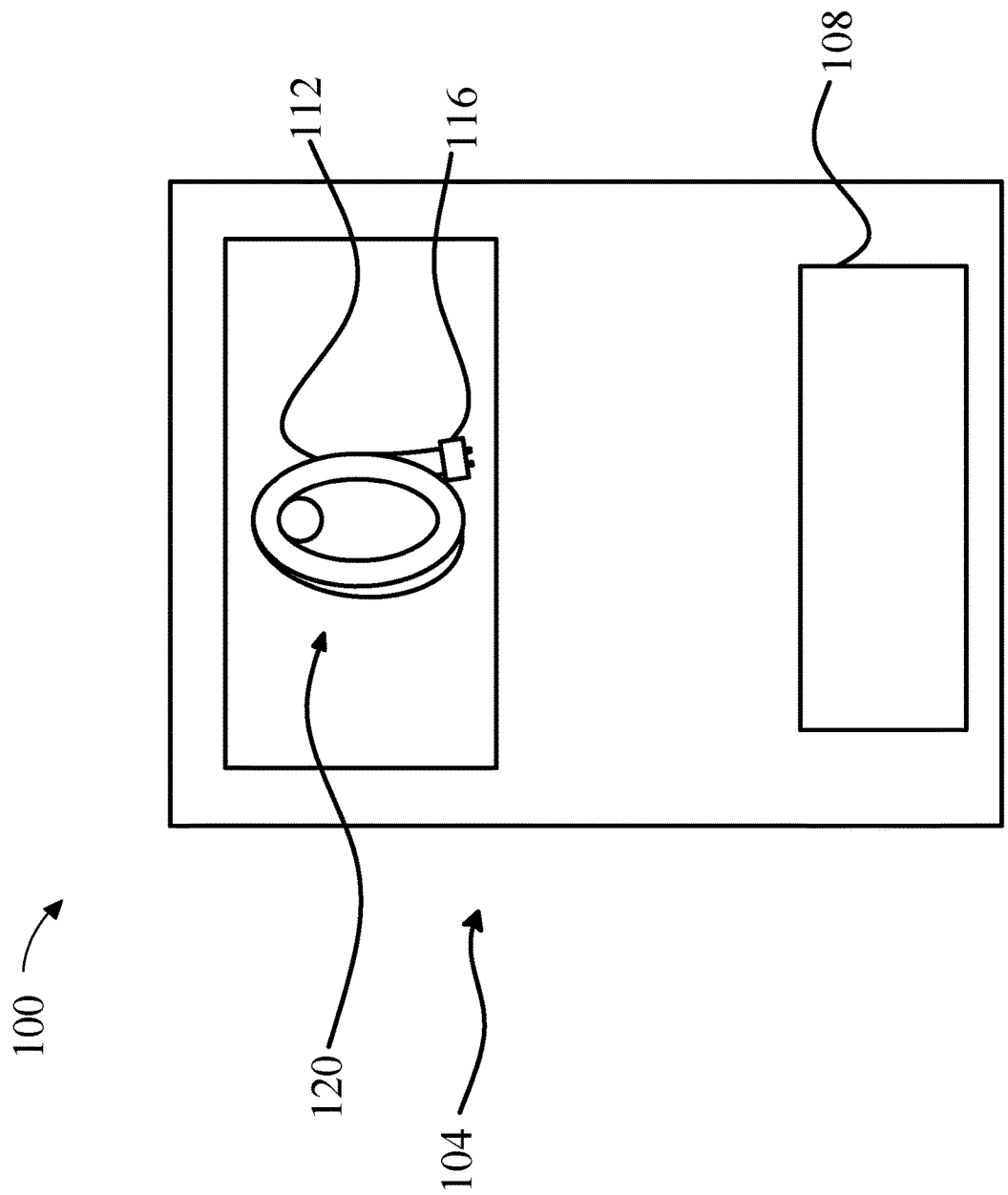
FIG. 1 is a depiction of an exemplary embodiment of a system for charging an electric aircraft including a vertical cable arrangement.

Referring now to FIG. 1, a system for charging an electric aircraft including a vertical cable arrangement 100 is depicted. System 100 includes a charger 104. A "charger," for the purposes of this disclosure, is a device that charges a battery. Charger 104 is configured to charge an electric aircraft. An "electric aircraft," for the purposes of this disclosure, refers to a machine that is able to fly by gaining support from the air generates substantially all of its thrust from electricity. As a non-limiting example, electric aircraft maybe capable of vertical takeoff and landing (VTOL) or conventional takeoff and landing (CTOL). As another non-limiting example, the electric aircraft may be capable of both VTOL and CTOL. As a non-limiting example, electric aircraft may be capable of edgewise flight. As a non-limiting example, electric aircraft may be able to hover. Electric aircraft may include a variety of electric propulsion devices; including, as non-limiting examples, pushers, pullers, lift devices, and the like.

With continued reference to FIG. 1, charger 104 includes an energy source 108. An "energy source," for the purposes of this disclosure, is a source of electrical power. In some embodiments, energy source 108 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, energy source 108 need not be made up of only a single electrochemical cell, it can consist of several electrochemical cells wired in series or in parallel. In other embodiments, energy source 108 may be a connection to the power grid. For example, in some non-limiting embodiments, energy source 108 may include a connection to a grid power component. Grid power component may be connected to an external electrical power grid. In some other embodiments, the external power grid may be used to charge batteries, for example, when energy source 108 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of system 100 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of system 100 may be consistent with the charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 1, system 100 may include a charging cable 112. A "charging cable," for the purposes of this disclosure is a conductor or conductors adapted to carry power for the purpose of charging an electronic device. Charging cable 112 is configured to carry electricity. Charging cable 112 is electrically connected to the energy source 108. "Electrically connected," for the purposes of this disclosure, means a connection such that electricity can be transferred over the connection. In some embodiments, charging cable 112 may carry AC and/or DC power to a charging connector 116. The charging cable may include a coating, wherein the coating surrounds the conductor or conductors of charging cable 112. One of ordinary skill in the art, after having reviewed the entirety of this disclosure, would appreciate that a variety of coatings are suitable for use in charging cable 112. As a non-limiting example, the coating of charging cable 112 may comprise rubber. As another non-limiting example, the coating of charging cable 112 may comprise nylon. Charging cable 112 may be a variety of lengths depending on the length required by the specific implementation. As a non-limiting example, charging cable 112 may be 10 feet. As another non-limiting example, charging cable 112 may be 25 feet. As yet another non-limiting example, charging cable 112 may be 50 feet.

With continued reference to FIG. 1, charging connector 116 may include a variety of pins adapted to mate with a charging port disposed on an electric aircraft. The variety of pins included on charging connector 116 may include, as non-limiting examples, a set of pins chosen from an alternating current (AC) pin, a direct current (DC) pin, a ground pin, a communication pin, a sensor pin, a proximity pin, and the like. In some embodiments, charging connector 116 may include more than one of one of the types of pins mentioned above.

With continued reference to FIG. 1, for the purposes of this disclosure, a "pin" may be any type of electrical connector. An electrical connector is a device used to join electrical conductors to create a circuit. As a non-limiting example, in some embodiments, any pin of charging connector 116 may be the male component of a pin and socket connector. In other embodiments, any pin of charging connector 116 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 116 may include a locking mechanism. For instance, as a non-limiting example, any pin of charging connector 116 may include a locking mechanism to lock the pins in place. The pin or pins of charging connector 116 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

With continued reference to FIG. 1, in some embodiments, charging connector 116 may include a DC pin. DC pin supplies DC power. "DC power," for the purposes of this disclosure refers, to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector 116 may include a ground pin. A ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, in some embodiments, charging connector 116 may include a communication pin. A communication pin is an electric connector configured to carry electric signals between components of charging system 100 and components of an electric aircraft. As a non-limiting example, communication pin may carry signals from a controller in a charging system (e.g. controller 304) to a controller onboard an electric aircraft such as a flight controller or battery management controller. A person of ordinary skill in the art would recognize, after having reviewed the entirety of this disclosure, that communication pin could be used to carry a variety of signals between components.

With continued reference to FIG. 1, charging connector 116 may include a variety of additional pins. As a non-limiting example, charging connector 116 may include a proximity detection pin. Proximity detection pin has no current flowing through it when charging connector 116 is not connected to a port. Once charging connector 116 is connected to a port, then proximity detection pin will have current flowing through it, allowing for the controller to detect, using this current flow, that the charging connector 116 is connected to a port.

With continued reference to FIG. 1, system 100 includes a vertical cable arrangement. A "cable arrangement," for the purposes of this disclosure, is a configuration for a cable, wherein the configuration relates to how the cable is laid out or arranged. "Vertical cable arrangement," is a cable arrangement, wherein the charging cable exits the cable arrangement in an orientation that is perpendicular to the ground. Vertical cable arrangement 120 includes at least a length of charging cable 112. In some embodiments, vertical cable arrangement 120 may include a service loop of charging cable 112, wherein a "service loop," for the purposes of this disclosure, is An extra length of wire or cable included in an electrical or electromechanical assembly for neatness, accessibility, freedom of movement or future serviceability.

Figure 2:
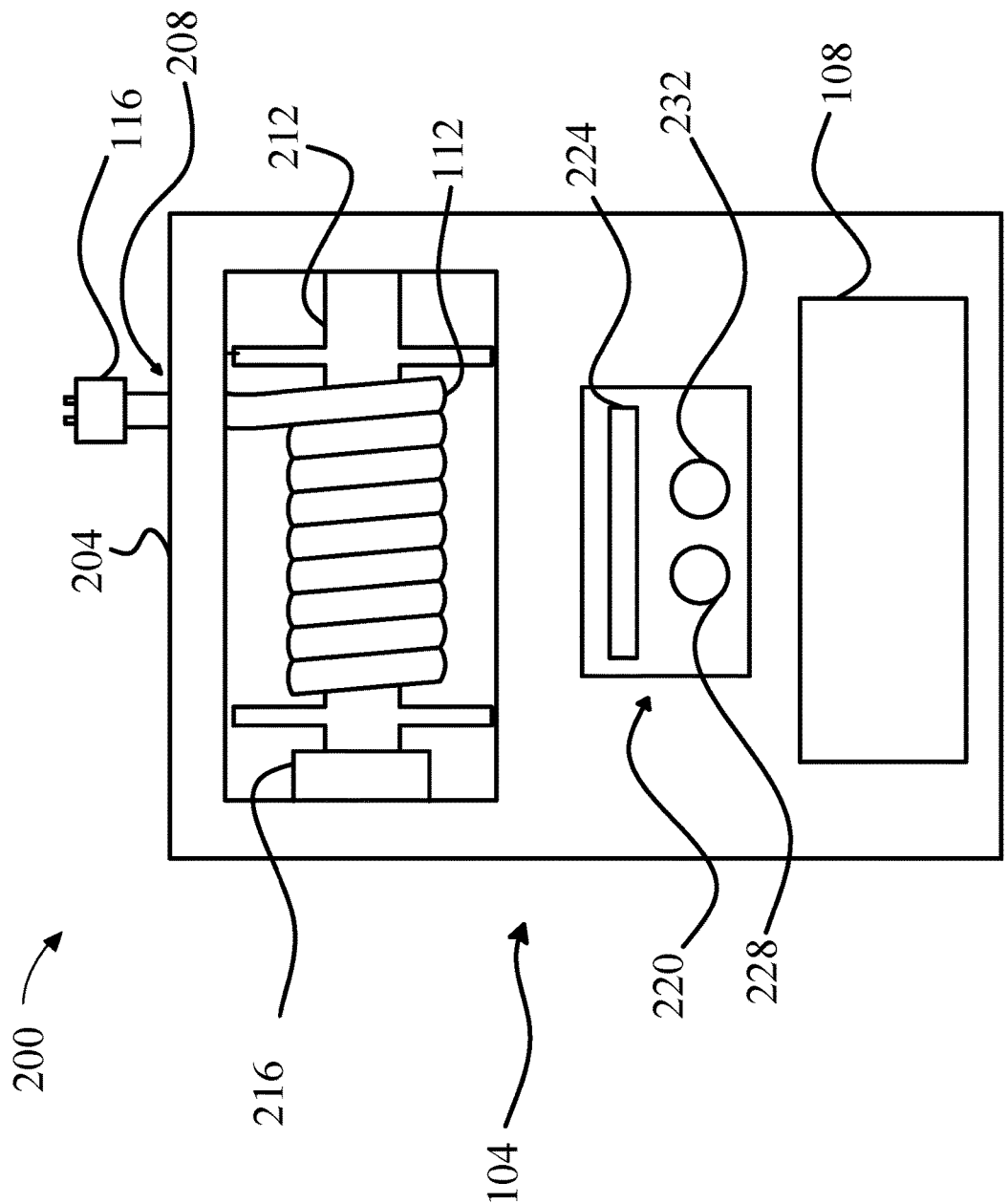
FIG. 2 is a depiction of another exemplary embodiment of a system for charging an electric aircraft including a vertical cable arrangement.

Referring now to FIG. 2, another exemplary embodiment of a system 200 for charging an electric aircraft including a vertical cable arrangement is shown. System 200 may be consistent with system 100 disclosed with reference to FIG. 1. System 200 includes charger 104, energy source 108, vertical cable arrangement 120, charging cable 112, and charging connector 116.

With continued reference to FIG. 2, in some embodiments, vertical cable arrangement 120 may be inside of a vertical cable arrangement container 204. For the purposes of this disclosure, a "vertical cable arrangement container" is an object that holds or encloses a vertical cable arrangement. In some embodiments, vertical cable arrangement container 204 may enclose vertical cable arrangement 120. In some embodiments, vertical cable arrangement container 204 may enclose vertical cable arrangement completely, with the exception of an outlet. In some embodiments, vertical cable arrangement container 204 may enclose vertical cable arrangement on all but one side. As a non-limiting example, vertical cable arrangement 120 may be accessible when in vertical cable arrangement container from the top side. As a non-limiting example, vertical cable arrangement container 204 may be a tray. As another non-limiting example, vertical cable arrangement container 204 may be a box.

With continued reference to FIG. 2, in some embodiments, vertical cable arrangement container 204 may include a cable exit hole 208. For the purposes of this disclosure, a "cable exit hole" is a hole in an enclosure, configured to allow a charging cable to pass through it and out of the enclosure. One of ordinary skill in the art, after having reviewed the entirety of this disclosure, would appreciate that cable exit hole 208 may take a wide variety of shapes depending on the profile of charging cable 112 and the design considerations. As a non-limiting example, cable exit hole 208 may be circular. As another non-limiting example, cable exit hole 208 may be rectangular. As yet another non-limiting example, cable exit hole 208 may be oval shaped. In some embodiments, cable exit hole 208 may be sized such that charging cable 112 and charging connector 116 may pass through it. For example, this may allow both charging connector 116 and charging cable 112 to be inside of vertical cable arrangement container 204 when charging cable 112 is in the stowed configuration. In some embodiments, cable exit hole 208 may be sized such that charging cable 112, but not charging connector 116, may pass through it. For example, this would mean that, in the stowed configuration, charging cable 112 may be inside of vertical cable arrangement container 204, but charging connector 116 may rest on the outside of vertical cable arrangement container 204. This may allow, for example, for easy access to the charging connector 116. In some embodiments, when charging cable 112 exits from cable exit hole 208 it may exit cable exit hole 208 substantially perpendicular to the ground.

With continued reference to FIG. 2, vertical cable arrangement 120, in some embodiments, may include a cable reel 212. For the purposes of this disclosure, a "reel" is a rotary device around which an object may be wrapped. In some embodiments, cable reel 212 may be rotatably mounted to the vertical cable arrangement container 204. In some embodiment, cable reel 212 may be rotatably mounted to the insider of the vertical cable arrangement container 204. For the purposes of this disclosure, "rotatably mounted" means mounted such that the mounted object may rotate with respect to the object that the mounted object is mounted on. Additionally, when the charging cable 112 is in a stowed configuration, the charging cable 112 may be wound around cable reel 212. As a non-limiting example, charging cable 112 is in a stowed configuration in FIG. 2. In a stowed configuration, charging cable 112 does not need to be completely wound around cable reel 212. As a non-limiting example, a portion of charging cable 112 may hang free from cable reel 212 even when charging cable 112 is in the stowed configuration.

With continued reference to FIG. 2, in some embodiments, vertical cable arrangement 120 includes a rotator 216. A "rotator," for the purposes of this disclosure is a mechanism that is configured to cause another object to undergo rotary motion. As a non-limiting example, rotation mechanism may include a rotary actuator. As a non-limiting example, rotator 216 may include an electric motor. As another non-limiting example, rotator 216 may include a servomotor. As yet another non-limiting example, rotator 216 may include a stepper motor. In some embodiments, rotator 216 may include a compliant element. For the purposes of this disclosure, a "compliant element" is an element that creates force through elastic deformation. As a non-limiting example, rotator 216 may include a torsional spring, wherein the torsional spring may elastically deform when cable reel 212 is rotated in, for example, the forward direction; this would cause the torsional spring to exert torque on cable reel 212, causing cable reel 212 to rotate in a reverse direction when it has been released. Rotator 216 is configured to rotate cable reel 212 in a forward direction and a reverse direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 112 to extend, whereas rotating in the reverse direction may cause charging cable 112 to stow, or vice versa. In some embodiments, rotator 216 may continually rotate cable reel 212 when rotator 216 is enabled. In some embodiments, rotator 216 may be configured to rotate cable reel 212 by a specific number of degrees. In some embodiments, rotator 216 may be configured to output a specific torque to cable reel 212. As a non-limiting example, this may be the case, wherein rotator 216 is a torque motor. Rotator 216 may be electrically connected to energy source 108. Rotator 216 may be consistent with any rotation mechanism disclosed in U.S. patent application Ser. No. 17/736,530, filed May 4, 2022, and titled "SYSTEM FOR AN ELECTRIC AIRCRAFT CHARGING WITH A CABLE REEL."

With continued reference to FIG. 2, system 200 may include a control panel 220. For the purposes of this disclosure, a "control panel" is a panel containing a set of controls for a device. Control panel 220 may include, for example, a display 224, a rotation toggle 228, and lift toggle 232. For the purposes of this disclosure, a "display" is an electronic device for the visual presentation of information. Display 224 may be any type of screen. As non-limiting examples, display 224 may be an LED screen, an LCD screen, an OLED screen, a CRT screen, a DLPT screen, a plasma screen, a cold cathode display, a heated cathode display, a nixie tube display, and the like. Display 224 may be configured to display any relevant information. A person of ordinary skill in the art would appreciate, after having reviewed the entirety of this disclosure, that a variety of information could be displayed on display 224. In some embodiments, display 224 may display metrics associated with the charging of an electric aircraft. As a non-limiting example, this may include energy transferred. As another non-limiting example, this may include charge time remaining. As another non-limiting example, this may include charge time elapsed. As another non-limiting example, display 224 may include warnings related to the charging of the electric aircraft. For example, temperature warnings or electrical short warnings.

With continued reference to FIG. 2, rotation toggle 228 may be configured to send a forward rotation toggle signal to a controller, wherein the forward rotation toggle signal may cause the controller to send a forward rotation signal to rotator 216. A "toggle" for the purposes of this disclosure, is a device or signal, configured to change a mechanism or device between at least two states. A "rotation toggle," for the purposes of this disclosure, is a toggle that changes or alters the rotation of a device. Rotation toggle 228 may be configured to send a reverse rotation toggle signal to the controller, wherein the reverse rotation toggle signal may cause controller to send a reverse rotation signal to rotator 216. A "rotation toggle signal," for the purposes of this disclosure, is a signal sent by a rotation toggle, wherein the rotation toggle signal gives rise to, directly or indirectly, a change or alteration of the rotation of a device. In some embodiments, rotation toggle 228 may be a button, wherein pressing the button causes rotation toggle 228 to send the forward rotation toggle signal or the reverse rotation toggle signal. In some embodiments, rotation toggle 228 may be disposed on outside of charger 104. In some embodiments, rotation toggle 228 may be disposed on the outside of vertical cable arrangement container 204. In some embodiments, rotation toggle 228 may be disposed on charging connector 116. Rotation toggle 228, the controller, forward rotation toggle signal, reverse rotation toggle signal, forward rotation signal, and reverse rotation signal are discussed further with reference to FIG. 3.

With continued reference to FIG. 2, lift toggle 232 may be configured to send a lift raising toggle signal to a controller, wherein the lift raising toggle signal may cause the controller to send a lift raising signal to a lift. A "lift toggle," for the purposes of this disclosure, is a toggle that, directly or indirectly, changes or alters the state of a lift. Lift toggle 232 may be configured to send a lift lowering toggle signal to the controller, wherein the lift lowering toggle signal may cause the controller to send a lift lowering signal to a lift. A "lift lowering toggle signal," for the purposes of this disclosure, is a signal send by a lift toggle, wherein the lift lowering toggle signal gives rise to, indirectly or directly, the lowering of a lift. In some embodiments, lift toggle 232 may be a button, wherein pressing the button causes lift toggle 232 to send the lift raising toggle signal or the lift lowering toggle signal. A "lift raising toggle signal," for the purposes of this disclosure, is a signal send by a lift toggle, wherein the lift lowering toggle signal gives rise to, indirectly or directly, the raising of a lift. In some embodiments, lift toggle 232 may be disposed on outside of charger 104. In some embodiments, lift toggle 232 may be disposed on the outside of vertical cable arrangement container 204. In some embodiments, lift toggle 232 may be disposed on charging connector 116. lift toggle 232, the controller, lift raising toggle signal, lift lowering toggle signal, lift raising signal, and lift lowering signal are discussed further with reference to FIG. 3. The lift is discussed further with reference to FIG. 5 and FIG. 6.

With continued reference to FIG. 2, a variety of devices may be used for rotation toggle 228 and/or lift toggle 232. In some embodiments, rotation toggle 228 and/or lift toggle 232 may include a button. As non-limiting examples, the button may be a mechanical button, a resistive button, a capacitive button, and the like. As another non-limiting example, the button may be a virtual button on a touchscreen. In some embodiments, rotation toggle 228 and/or lift toggle 232 may include a dial. The dial may include any number of positions, or it may be a continuous dial. In some embodiments, the dial may have 2 positions, wherein one position may be disengaged, and the second position may be engaged, and thus cause a toggle signal to be sent to the controller. In some embodiments, for rotation toggle 228, the dial may include an additional third position, wherein the second position causes the forward rotation toggle signal to be sent and the second position causes the reverse rotation toggle signal to be sent. In some embodiments, for lift toggle 232, the dial may include an additional third position, wherein the second position causes the lift raising toggle signal to be sent and the second position causes the lift lowering toggle signal to be sent. In some embodiments, rotation toggle 228 and/or lift toggle 232 may include a rocker switch. In some embodiments, the rocker switch may have two positions, wherein one position may be disengaged, and the second position may be engaged, and thus cause a toggle signal to be sent to the controller. In some embodiments, for rotation toggle 228, the rocker switch may include an additional third position, wherein the second position causes the forward rotation toggle signal to be sent and the second position causes the reverse rotation toggle signal to be sent. In some embodiments, for lift toggle 232, the rocker switch may include an additional third position, wherein the second position causes the lift raising toggle signal to be sent and the second position causes the lift lowering toggle signal to be sent. One of ordinary skill in the art would appreciate, after having reviewed the entirety of this disclosure, that a variety of possible devices may be suitable for use as rotation toggle 228 and/or lift toggle 232. Furthermore, one of ordinary skill in the art would appreciate, after having reviewed the entirety of this disclosure, that many additional controls and types of controls may be included in control panel 220 in addition to the controls described above.

Figure 3:
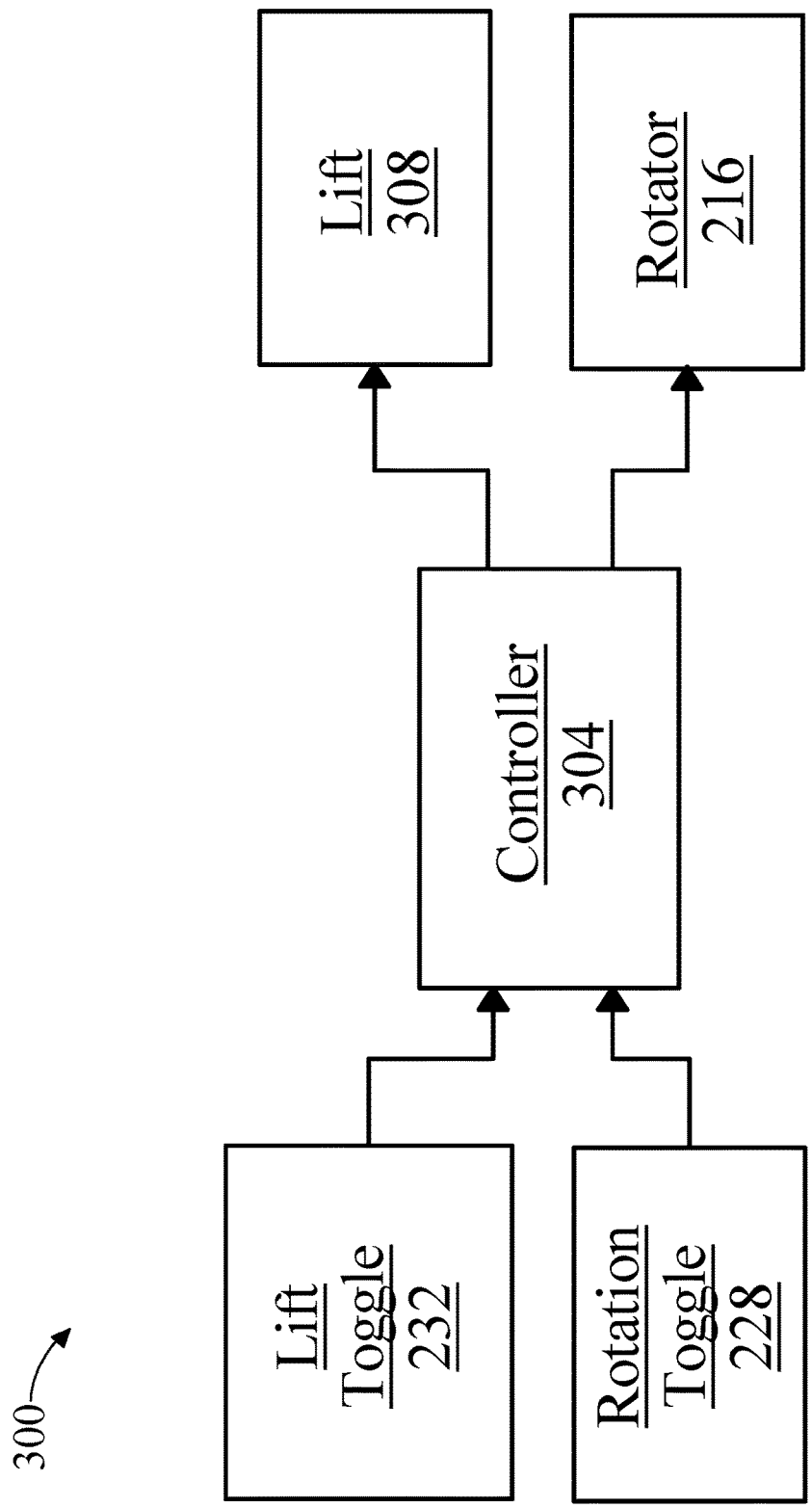
FIG. 3 is a block diagram of an exemplary embodiment of control system for an electric aircraft charging system.

Referring now to FIG. 3, an exemplary embodiment of control system for an electric aircraft charging system 300 is shown. System 300, includes a controller 304. Controller 304 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 304 may include a single computing device operating independently, or may include two or more computing device operating in concert, in parallel, sequentially or the like; two or more computing devices may be included together in a single computing device or in two or more computing devices. Controller 304 may interface or communicate with one or more additional devices as described below in further detail via a network interface device. Network interface device may be utilized for connecting controller 304 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 304 may include but is not limited to, for example, a computing device or cluster of computing devices in a first location and a second computing device or cluster of computing devices in a second location. controller 304 may include one or more computing devices dedicated to data storage, security, distribution of traffic for load balancing, and the like. controller 304 may distribute one or more computing tasks as described below across a plurality of computing devices of computing device, which may operate in parallel, in series, redundantly, or in any other manner used for distribution of tasks or memory between computing devices. controller 304 may be implemented using a "shared nothing" architecture in which data is cached at the worker, in an embodiment, this may enable scalability of system 100 and/or computing device.

With continued reference to FIG. 3, controller 304 may be designed and/or configured to perform any method, method step, or sequence of method steps in any embodiment described in this disclosure, in any order and with any degree of repetition. For instance, controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, controller 304 may be communicatively connected to rotator 216. Controller 304 may be communicatively connected to an opening mechanism 516. "Communicatively connected," for the purpose of this disclosure, means connected such that data can be transmitted, whether wirelessly or wired. Controller 304 may be configured send a forward rotation signal to the rotator 216 in response to receiving a forward rotation toggle signal, wherein the forward rotation signal causes the rotator 216 to rotate in the forward direction. Accordingly, when rotator 216 rotates in a forward direction, rotator 216 may cause cable reel 212 to rotate in a forward direction. Controller 304 may be configured send a reverse rotation signal to the rotator 216 in response to receiving a reverse rotation toggle signal, wherein the reverse rotation signal causes the rotator 216 to rotate in the reverse direction. Accordingly, when rotator 216 rotates in a reverse direction, rotator 216 may cause cable reel 212 to rotate in a reverse direction. Forward direction and reverse direction may be consistent with any forward direction and reverse direction, respectively, disclosed as part of this disclosure. In some embodiments, controller 304 may be further configured to send a lift raising signal to a lift 308, wherein the lift raising causes the lift 308 to move from a first lift position to a second lift position. In some embodiments, controller 304 may be further configured to controller to send a lift lowering signal to lift 308, wherein the lift lowering signal causes lift 308 to move from the second lift position to the first lift position. Lift 308, first lift position, and second lift position are described further with reference to FIG. 5 and FIG. 6. In some embodiments, controller 304 may send lift raising signal and/or lift lowering signal in response to receiving a signal from a computing system, such as flight controller 904, on board the electric aircraft to be charged. In some embodiments, controller 304 may send the forward rotation signal and/or the reverse rotation signal in response to receiving a signal from a computing system, such as flight controller 904, on board the electric aircraft to be charged. These signals from the computing system may be transmitted wirelessly through radio, WiFi, Bluetooth, cellular communication, and the like. These signals can also be transmitted by wired communication, through, as a non-limiting example, a communication pin on charging connector 116.

With continued reference to FIG. 3, system 300 may further include rotation toggle 228. Rotation toggle 228 may be communicatively connected to controller 304. Rotation toggle 228 may be configured to send a forward rotation signal to controller 304. In some embodiments, controller 304 may be configured to send a forward rotation signal to the rotator in response to receiving a forward rotation toggle signal. In some embodiments, rotation toggle 228 may be configured to send forward rotation toggle signal to controller 304 for as long as rotation toggle 228 is pressed or otherwise engaged. Furthermore, controller 304 may be configured to send the forward rotation signal to rotator 216 so long as controller 304 is receiving the forward rotation toggle signal. In this way, a user may control when rotator 216 extends charging cable 112 by engaging and disengaging rotation toggle 228. In other embodiments, engaging reel toggle once, for any amount of time, may be sufficient to fully stow or unstow charging cable 112. In some embodiments, rotation toggle 228 may be configured to send a reverse rotation toggle signal to controller 304. Reverse rotation toggle signal may cause controller 304 to send a reverse rotation signal. reverse rotation signal may be sent by controller 304 to rotator 216. In some embodiments, rotation toggle 228 may be configured to send a reverse rotation toggle signal to controller 304 for as long as rotation toggle 228 is pressed or otherwise engaged. Furthermore, controller 304 may be configured to send the reverse rotation signal to rotator 216 so long as controller 304 is receiving the reverse rotation toggle signal. In this way, a user may control when rotator 216 retracts charging cable 112 by engaging and disengaging rotation toggle 228. In some embodiments, pushing or otherwise engaging rotation toggle 228 may cause rotation toggle 228 to send either forward rotation toggle signal or reverse rotation toggle signal, depending on the last signal that was send by rotation toggle 228. As a non-limiting example, if rotation toggle 228 is pressed or otherwise engaged a first time, it may send a forward rotation toggle signal and if rotation toggle 228 is pressed or otherwise engaged a second time, rotation toggle 228 may send a reverse rotation toggle signal. In some embodiments, if rotation toggle 228 is pushed or otherwise engaged a third time, rotation toggle 228 may send the forward rotation toggle signal again.

With continued reference to FIG. 3, system 300 may further include a lift toggle 232. Lift toggle 232 may be communicatively connected to controller 304. In some embodiments, lift toggle 232 may be configured to send a lift raising toggle signal to controller 304, which may cause controller 304 to send lift raising signal to lift 308. In some embodiments, lift toggle 232 may be configured to send a lift lowering toggle signal to controller 304, which may cause controller 304 to send lift lowering signal to lift 308. In some embodiments, pushing or otherwise engaging lift toggle 232 may cause lift toggle 232 to send either lift raising toggle signal or lift lowering toggle signal, depending on the last signal that was send by lift toggle 232. As a non-limiting example, if lift toggle 232 is pressed or otherwise engaged a first time, it may send a lift raising toggle signal and if lift toggle 232 is pressed or otherwise engaged a second time, lift toggle 232 may send a lift lowering toggle signal. In some embodiments, if lift toggle 232 is pushed or otherwise engaged a third time, lift toggle 232 may send the lift raising toggle signal again.

Figure 4:
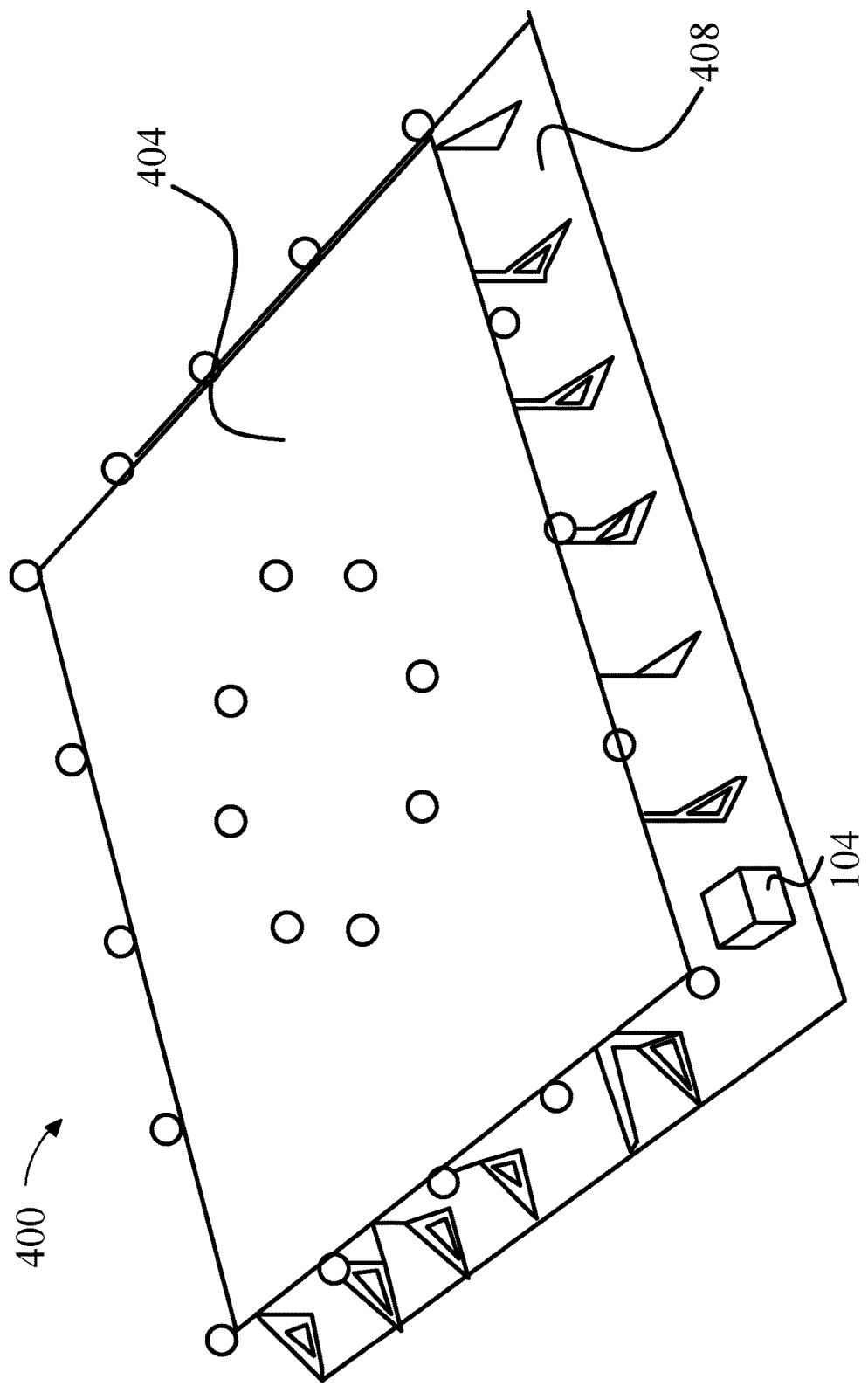
FIG. 4 is a depiction of an exemplary embodiment of a helipad.

Referring now to FIG. 4, a helipad 400 is depicted. For the purposes of this disclosure, a "helipad" is a structure adapted for the vertical landings of aircraft. In some embodiments, charger 104 may be disposed on helipad 400. In some embodiments, helipad 400 may include a landing surface 404. In some embodiments, landing surface 404 may be a substantially horizontal, planar surface. For the purposes of this disclosure, "substantially horizontal" means that an object differs no more than an average of 5 degrees from horizontal. In some embodiments, landing surface 404 may be large enough to accommodate an electric aircraft. As a non-limiting example, landing surface 404 may be 1000 square feet. As another non-limiting example, landing surface 404 may be 2000 square feet. As another non-limiting example, landing surface 404 may be 3000 square feet. As yet another non-limiting example, landing surface 404 may be 800 square feet. In some embodiments, system 100 may be disposed at an elevation less than that of the landing surface 404. In some embodiments, system 100 may be disposed on a lower surface 408. Lower surface 408 may be a surface at a lower elevation that landing surface 404. In some embodiments, where charger 104 is disposed on lower surface 408, system 100 may be at a lower elevation than landing surface 404.

Figure 5:
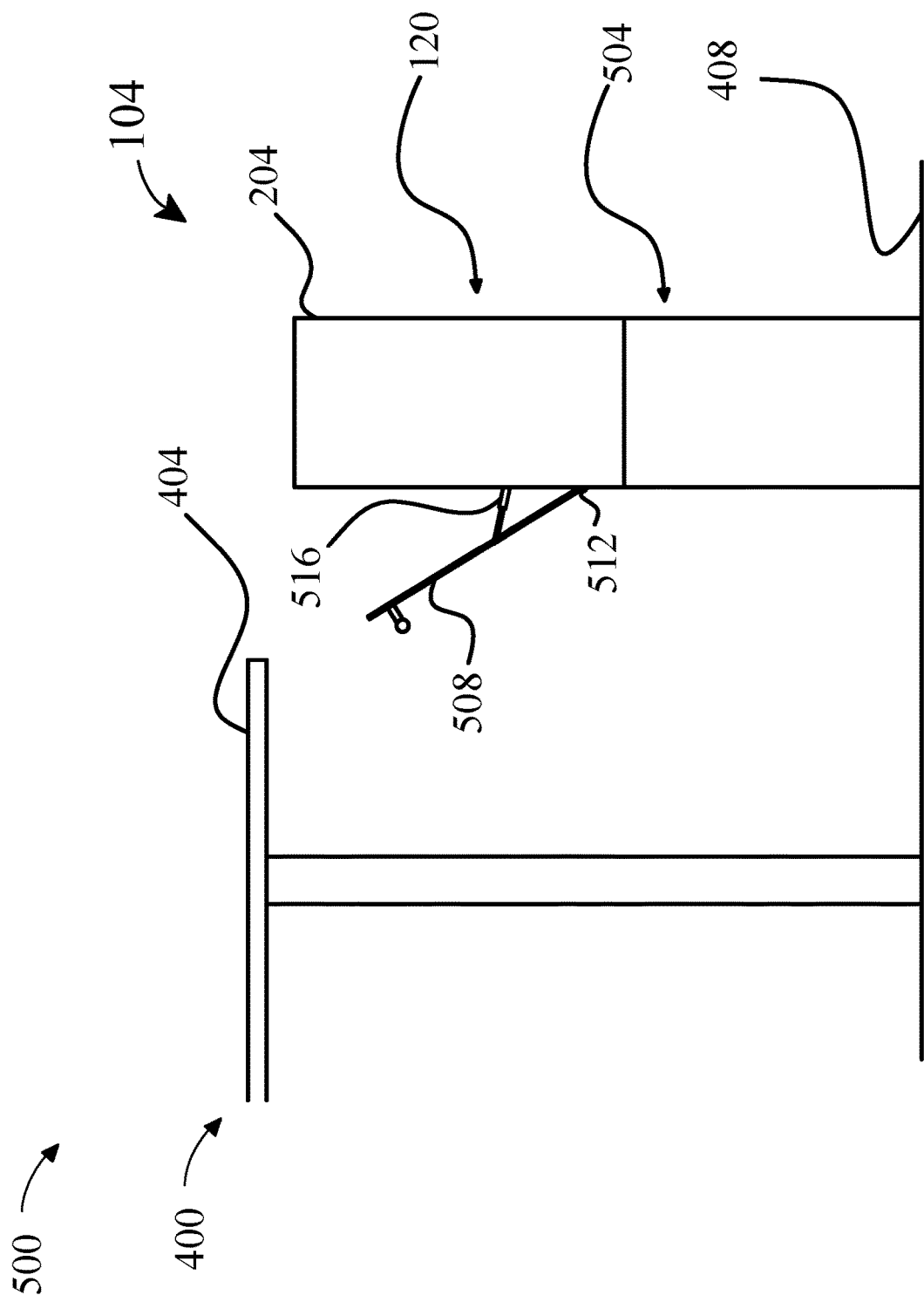
FIG. 5 is an exemplary embodiment of a system for charging an electric aircraft on a helipad, wherein the system is in a lowered position.

Referring now to FIG. 5, an embodiment of a system 500 for charging an electric aircraft on a helipad is shown. System 500 may include an embodiment of helipad 400, which may include landing surface 404 and lower surface 408. System 500 includes charger 104 and vertical cable arrangement 120. In some embodiments, charger 104 may be located on lower surface 408. In some embodiments, vertical cable arrangement 120 may be inside of vertical cable arrangement container 204.

With continued reference to FIG. 5, system 500 may include a charger base 504. A "charger base," for the purposes of this disclosure is the portion of a charging system that is in contact with the ground. In some embodiments, charger base 504 may be fixed to another structure. As a non-limiting example, charger base 504 may be fixed to helipad 400. In some embodiments, charger base may be attached to lower surface 408. As another non-limiting example, charger base 504 may be fixed to the ground. As another non-limiting example, charger base 504 may be fixed to a cart, wherein the cart may have wheels. One of ordinary skill in the art would appreciate, after having reviewed the entirety of this disclosure, that charger base 504 may fixed to a variety of structures or objects depending on the location and/or support requirements of charger 104. In some embodiments, charger base 504 may include With continued reference to FIG. 5, system 500 may include a vertical cable arrangement door 508. Vertical cable arrangement door 508 may have a closed position and an open position. When the vertical cable arrangement door 508 is in the closed position, it prevents access to vertical cable arrangement 120. As a non-limiting example, when vertical cable arrangement door 508 is in the closed position, vertical cable arrangement container 204 and vertical cable arrangement door 508 may together completely encapsulate vertical cable arrangement 120. When vertical cable arrangement door 508 is in the open position, it may allow access to vertical cable arrangement 120. As a non-limiting example, when vertical cable arrangement door 508 is in the open position, there may be an opening in vertical cable arrangement container 204 through which vertical cable arrangement 120 may be accessed. In some embodiments, when vertical cable arrangement door 508 is in its open position, vertical cable arrangement door 508 may provide an opening spanning at least two adjacent sides of the plurality of sides of vertical cable arrangement container 204. For example, in its open position, vertical cable arrangement door 508 may provide an opening on the front and top of vertical cable arrangement container 204, wherein front and top are defined with reference to FIG. 1. In some embodiments, in its open position, vertical cable arrangement door 508 may provide an opening on the front and left side of vertical cable arrangement container 204, wherein the front and left side are defined with reference to FIG. 1. In some embodiments, vertical cable arrangement door 508 may include a hinge, wherein the hinge hingidly connects two panels of vertical cable arrangement door 508. In some embodiments, vertical cable arrangement door 508 may be hingidly attached to vertical cable arrangement container 204 by a hinge 512. Hinge 512 may allow vertical cable arrangement door 508 to move between its open and closed positions. In some embodiments, vertical cable arrangement door 508 may be mounted on a track or set of tracks disposed on vertical cable arrangement container 204, such that vertical cable arrangement door 508 may be slid on the track or set of tracks between its open position and its closed position. One of ordinary skill in the art, after having reviewed the entirety of this disclosure, would appreciate that vertical cable arrangement door 508 may have a variety of different shapes and designs.

With continued reference to FIG. 5, in some embodiments vertical cable arrangement door 508 may include opening mechanism 516. Opening mechanism 516 may be configured to move vertical cable arrangement door 508 from its closed position to its open position when opening mechanism 516 receives a door open signal from controller 304. Opening mechanism 516 may be configured to move vertical cable arrangement door 508 from its open position to its closed position when opening mechanism 516 receives a door close signal from controller 304. One of ordinary skill in the art would appreciate, after having reviewed the entirety of this disclosure, that a variety of opening mechanism 516 are suitable for this application. As a non-limiting example, opening mechanism 516 may include a pneumatic cylinder. As another non-limiting example, opening mechanism 516 may include a hydraulic cylinder. As another non-limiting example, opening mechanism 516 may include a spring; in some embodiments, the spring may be biased to either move the vertical cable arrangement door 508 from its open position to its closed position or from its closed position to its open position when the spring is released. As yet another non-limiting example, opening mechanism 516 may include an electromechanical device such as an actuator, wherein the actuator may be consistent with any actuator disclosed as part of this disclosure. In some embodiments, as a non-limiting example, the actuator may be a linear actuator. In some embodiments, as another non-limiting example, the actuator may be a rotary actuator.

With continued reference to FIG. 5, system 500 also includes a lift 308 (not shown). Lift 308 is in contact with vertical cable arrangement 120. Additionally, lift 308 has a first position and a second position. When lift 308 is in the first position (as shown in FIG. 5), vertical cable arrangement 120 is in a first cable arrangement position. When vertical cable arrangement is in the first cable arrangement position, vertical cable arrangement 120 is at a first elevation. In some embodiment, the first elevation of the first cable arrangement position of vertical cable arrangement 120 is below a landing surface elevation of landing surface 404. For the purposes of this disclosure, the "elevation of the landing surface" is the average elevation of the landing surface. For the purposes of this disclosure, the "first elevation of the first cable arrangement position" is measured from top of vertical cable arrangement 120. In some embodiments, the first elevation of the first cable arrangement position may be such that, when vertical cable arrangement 120 is at this elevation, it is flush with, or otherwise in contact with charger base 504.

Figure 6:
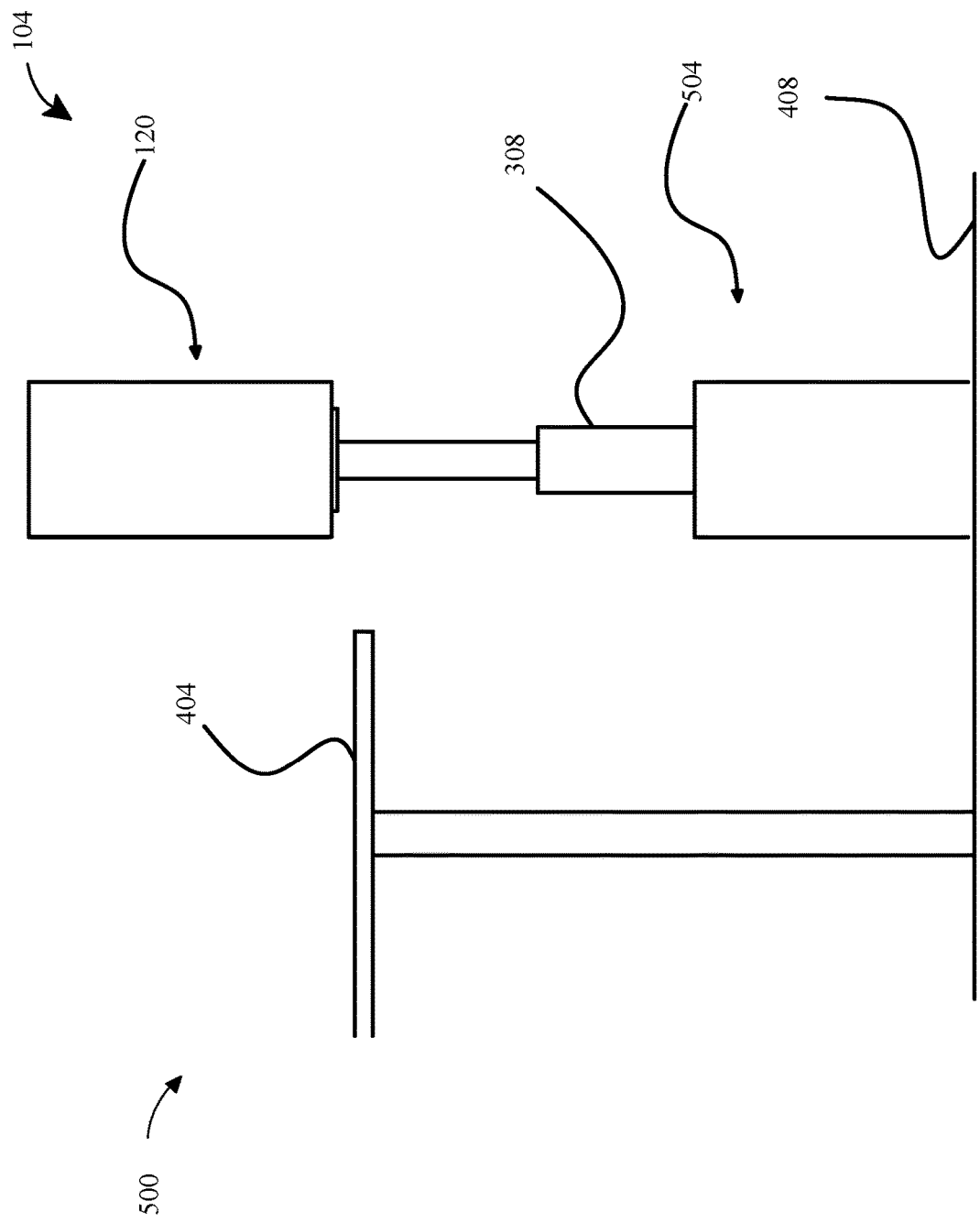
FIG. 6 is an exemplary embodiment of a system for charging an electric aircraft on a helipad, wherein the system is in a raised position.

Referring now to FIG. 6, an embodiment of system 500 is once again depicted. In this embodiment, lift 308 is in a second lift position. When lift 308 is in the second lift position, vertical cable arrangement 120 is in the second cable arrangement position. When vertical cable arrangement 120 is in the second cable arrangement position, vertical cable arrangement 120 is located at a second elevation, wherein the second elevation is greater than the first elevation. In some embodiments, the second elevation of the second cable arrangement position of vertical cable arrangement 120 may be at least partially above the landing surface elevation of landing surface 404. In some embodiments, the second elevation of the second cable arrangement position of the vertical cable arrangement 120 may be such that vertical cable arrangement 120 may be completely above the landing surface elevation of landing surface 404. For the purposes of this disclosure, vertical cable arrangement 120 is "completely above" the landing surface elevation of landing surface 404, when the bottom of vertical cable arrangement 120 has an elevation greater than the landing surface elevation of landing surface 404. In some embodiments, the second elevation of the second cable arrangement position of the vertical cable arrangement 120 may be such that vertical cable arrangement container 204 may be completely above the landing surface elevation of landing surface 404. For the purposes of this disclosure, vertical cable arrangement container 204 is "completely above" the landing surface elevation of landing surface 404, when the bottom of vertical cable arrangement container 204 has an elevation greater than the landing surface elevation of landing surface 404.

With continued reference to FIG. 6, in some embodiments, charger base 504 may have a fixed position. For the purposes of this disclosure, charger base 504 has a "fixed position" when it remains stationary regardless of whether vertical cable arrangement 120 is in the first or second cable arrangement position, and regardless of whether lift is in first lift position or second lift position. In some embodiments, lift 308 may be connected to charger base 504.

With continued reference to FIG. 6, a "lift," for the purposes of this disclosure, is a device that moves objects between at least a lower position and a higher position. In some embodiments, lift 308 may be manually operated. As a non-limiting example, a manual pully-and-rope system may be used to move lift 308 between first lift position and second lift position. In some embodiments, lift 308 may include a traction elevator. A traction elevator may include a rope that passed over a wheel attached to an electric motor. In some embodiments, lift 308 may include a hydraulic elevator. In some embodiments, a hydraulic elevator may include a hydraulic piston into which hydraulic fluid may be forced by a motor, causing the piston to rise. Conversely, in some embodiments, fluid may be released from the hydraulic cylinder in order to allow the hydraulic cylinder to fall. In some embodiments, lift 308 may include a pneumatic elevator. In some embodiments, a pneumatic elevator, generally, operated by creating vacuums in order to cause motion. In some embodiments, lift 308 may include a scissor lift. In some embodiments, lift 308 may include a rack-and-pinion lift. In some embodiments, lift 308 may include a series of wheels set in guide tracks, wherein the wheels are able to lift the elevator from the first position to the second position using the guide track.

Figure 7:
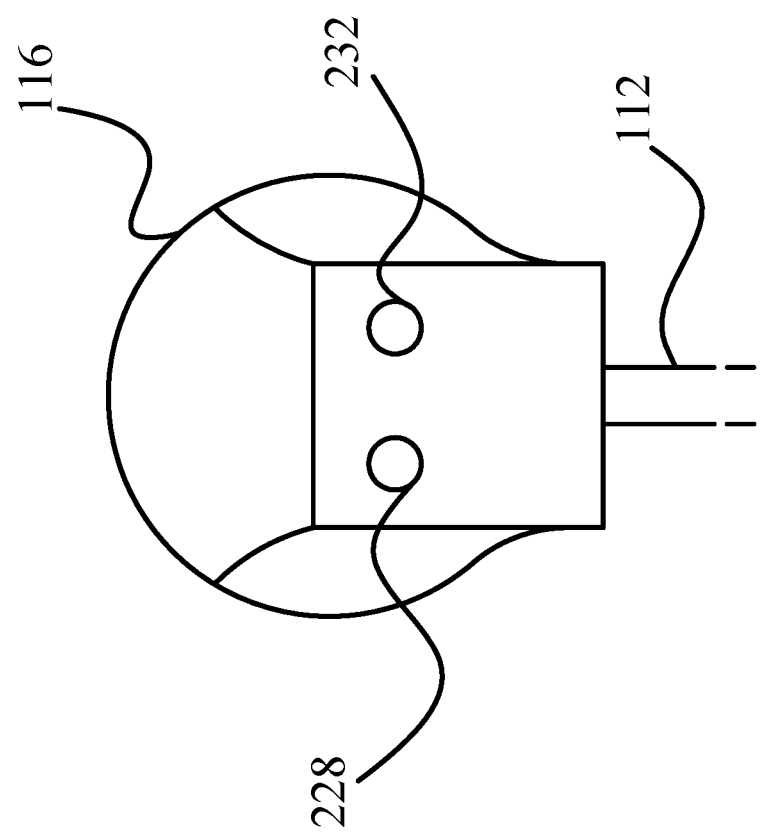
FIG. 7 is an exemplary embodiment of a charging connector.

Referring now to FIG. 7, an exemplary embodiment of charging connector 116 is depicted. Charging connector 116 is electrically connected to charging cable 112. lift toggle 232 and rotation toggle 228 may be disposed on the surface of charging connector 116. In some embodiments, charging connector 116 may have a handle portion on which lift toggle 232 and rotation toggle 228 may be disposed. In some embodiments, lift toggle 232 and rotation toggle 228 may be disposed on charging connector 116 such that a user that is holding charging connector is able to easily reach and use lift toggle 232 and rotation toggle 228.

Figure 8:
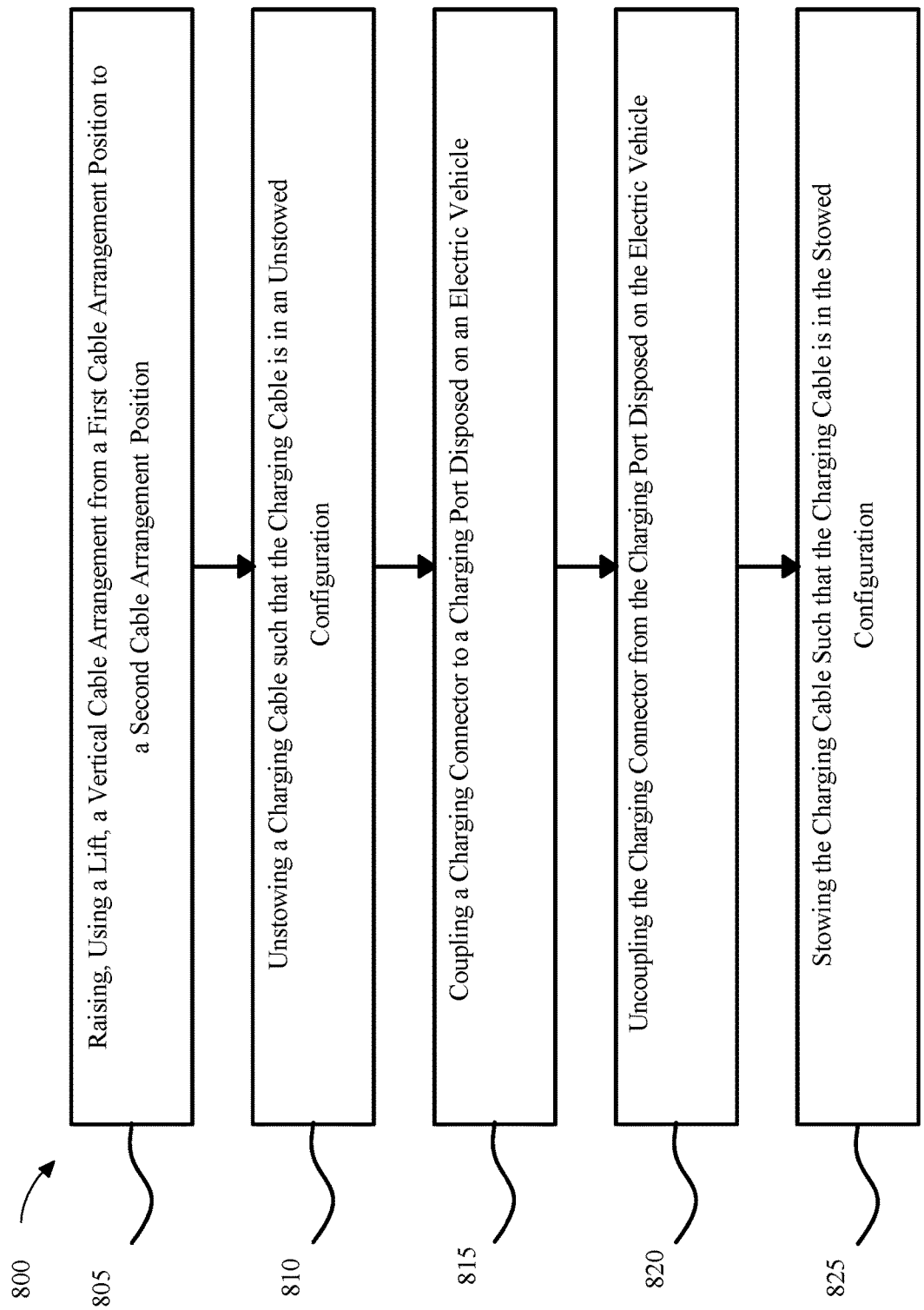
FIG. 8 is a flow chart of an exemplary embodiment of a method of charging an electric aircraft including a vertical cable arrangement.

Referring now to FIG. 8, a method of charging an electric aircraft including a vertical cable arrangement is shown. Method 800 includes a step 805 of raising, using a lift, a vertical cable arrangement from a first cable arrangement position to a second cable arrangement position. The lift may be consistent with any lift disclosed as part of this disclosure. In some embodiments, the lift may be a hydraulic elevator. In some embodiments, the lift may be a pneumatic elevator. The vertical cable arrangement may be consistent with any vertical cable arrangement disclosed as part of this disclosure. The first cable arrangement position may be consistent with any first cable arrangement position disclosed as part of this disclosure. The second cable arrangement position may be consistent with any second cable arrangement position. In step 805, a second elevation of the second cable arrangement position is greater than a first elevation of a first cable arrangement position. First elevation and second elevation may be consistent with any first elevation and second elevation, respectively, disclosed as part of this disclosure. Additionally, the vertical cable arrangement includes at least a length of a charging cable, wherein the charging cable is electrically connected to a charger including an energy source. The charging cable may be consistent with any charging cable disclosed as part of this disclosure. Charger may be consistent with any charger disclosed as part of this disclosure. Energy source may be consistent with any energy source disclosed as part of this disclosure. In some embodiments, step 805 may include sending a lift raising signal to the lift, wherein the lift raising signal causes the lift to move from a first lift position to a second lift position. Lift raising signal may be consistent with any lift raising signal disclosed as part of this disclosure. Lift raising signal may be sent by a controller, such as controller 304. A lift toggle, such as lift toggle 232, may cause controller to send the lift raising signal. In some embodiments, the first elevation of the first cable arrangement position of the vertical cable arrangement is below a landing surface elevation of a landing surface. First elevation may be consistent with any first elevation disclosed as part of this disclosure. Landing surface elevation may be consistent with any landing surface elevation disclosed as part of this disclosure. Landing surface may be consistent with any landing surface disclosed as part of this disclosure. In some embodiments, the landing surface is a substantially horizontal, planar surface that is part of a helipad. The helipad may be consistent with any helipad disclosed as part of this disclosure. In some embodiments, the landing surface is configured to accommodate an electric aircraft. The electric aircraft may be consistent with any electric aircraft disclosed as part of this disclosure.

With continued reference to FIG. 8, method 800 also includes a step 810 of unstowing a charging cable such that the charging cable is in an unstowed configuration. Charging cable may be consistent with any charging cable disclosed as part of this disclosure. The unstowed configuration may be consistent with any unstowed configuration that is part of this disclosure. In a stowed configuration, the charging cable is wound around a cable reel, wherein the cable reel is rotatably mounted to the charger. Cable reel may be consistent with any cable reel disclosed as part of this disclosure. In the unstowed configuration, at least a portion of the charging cable is not wound around the cable reel. In some embodiments, the second elevation of the second cable arrangement position of the vertical cable arrangement is at least partially above the landing surface elevation of the landing surface. In some embodiments, step 810 may further include sending a forward rotation signal to a rotator, wherein the forward rotation signal causes the rotator to rotate in a forward direction. Forward rotation signal may be consistent with any forward rotation signal disclosed as part of this disclosure. Rotator may be consistent with any rotator disclosed as part of this disclosure. Forward rotation signal may be sent by a controller, like controller 304. In some embodiments, a rotation toggle may cause the controller to send the forward rotation signal. Rotation toggle may be consistent with any rotation toggle disclosed as part of this disclosure. In some embodiments, the rotator is configured to rotate the reel in a forward direction.

With continued reference to FIG. 8, method 800 also includes a step 815 of coupling a charging connector to a charging port disposed on an electric vehicle. The charging connector may be consistent with any charging connector disclosed as part of this disclosure. The charging port may be consistent with any charging port disclosed as part of this disclosure. The charging connector is electrically connected to the charging cable. Additionally, the charging connector is configured to couple with a corresponding charging port on an electric aircraft.

With continued reference to FIG. 8, method 800 also includes a step 820 of uncoupling the charging connector from the charging port disposed on the electric vehicle. Method 800 also includes a step 825 of stowing the charging cable such that the charging cable is in the stowed configuration. The stowed configuration may be consistent with any stowed configuration disclosed as part of this disclosure. In some embodiments, step 825 includes sending a reverse rotation signal to the rotator, wherein the reverse rotation signal causes the rotator to rotate in a reverse direction. Reverse rotation signal may be consistent with any reverse rotation signal disclosed as part of this disclosure. In some embodiments, reverse rotation signal may be sent by a controller, like controller 304. In some embodiments, a rotation toggle may cause the controller to send the reverse rotation signal.

With continued reference to FIG. 8, in some embodiments, method 800 may include a further step of lowering, using the lift, the vertical cable arrangement from the second cable arrangement position to the first cable arrangement position. In some embodiments, lowering the vertical cable arrangement from the second cable arrangement position to the first cable arrangement position includes sending a lift lowering signal to the lift, wherein the lift lowering signal causes the lift to move from second lift position to a first lift position. Lift lowering signal may be consistent with any lift lowering signal disclosed as part of this disclosure. In some embodiments, lift lowering signal may be sent by a controller, like controller 304. In some embodiments, a lift toggle may cause controller to sent the lift lowering signal.

Figure 9:
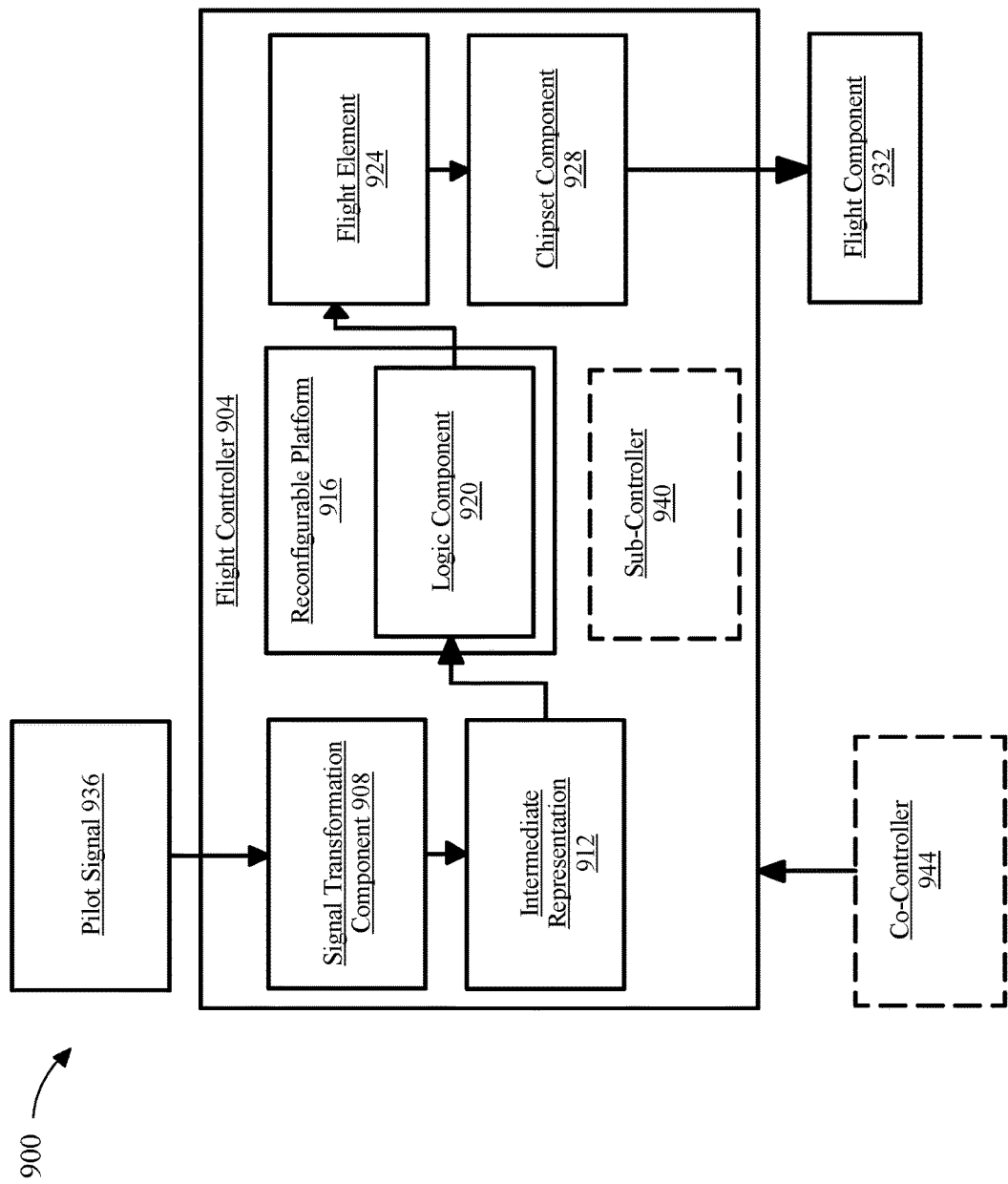
FIG. 9 is a block diagram of an exemplary flight controller.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 932 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path including a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
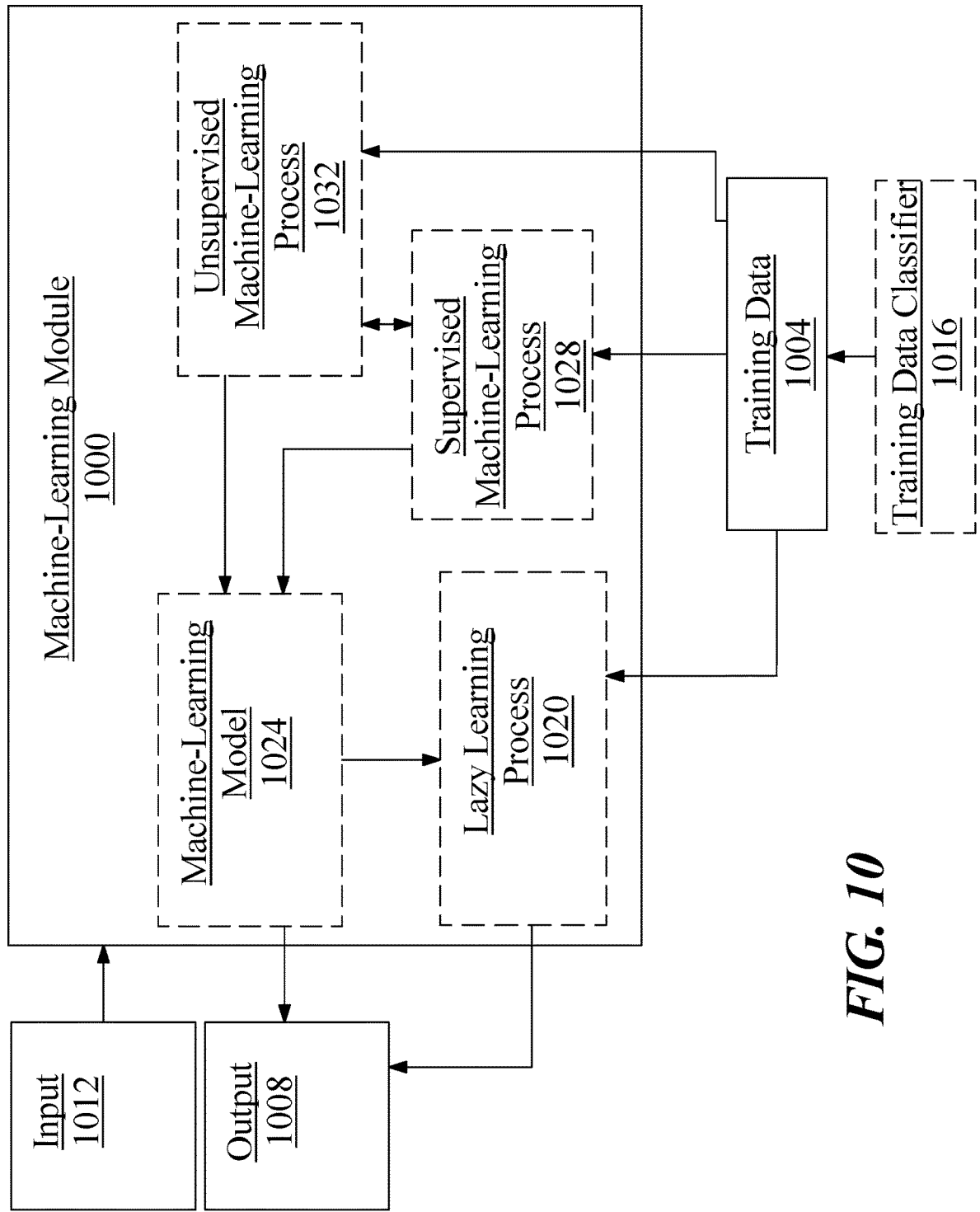
FIG. 10 is a block diagram of an exemplary machine learning model.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network including an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Figure 11:
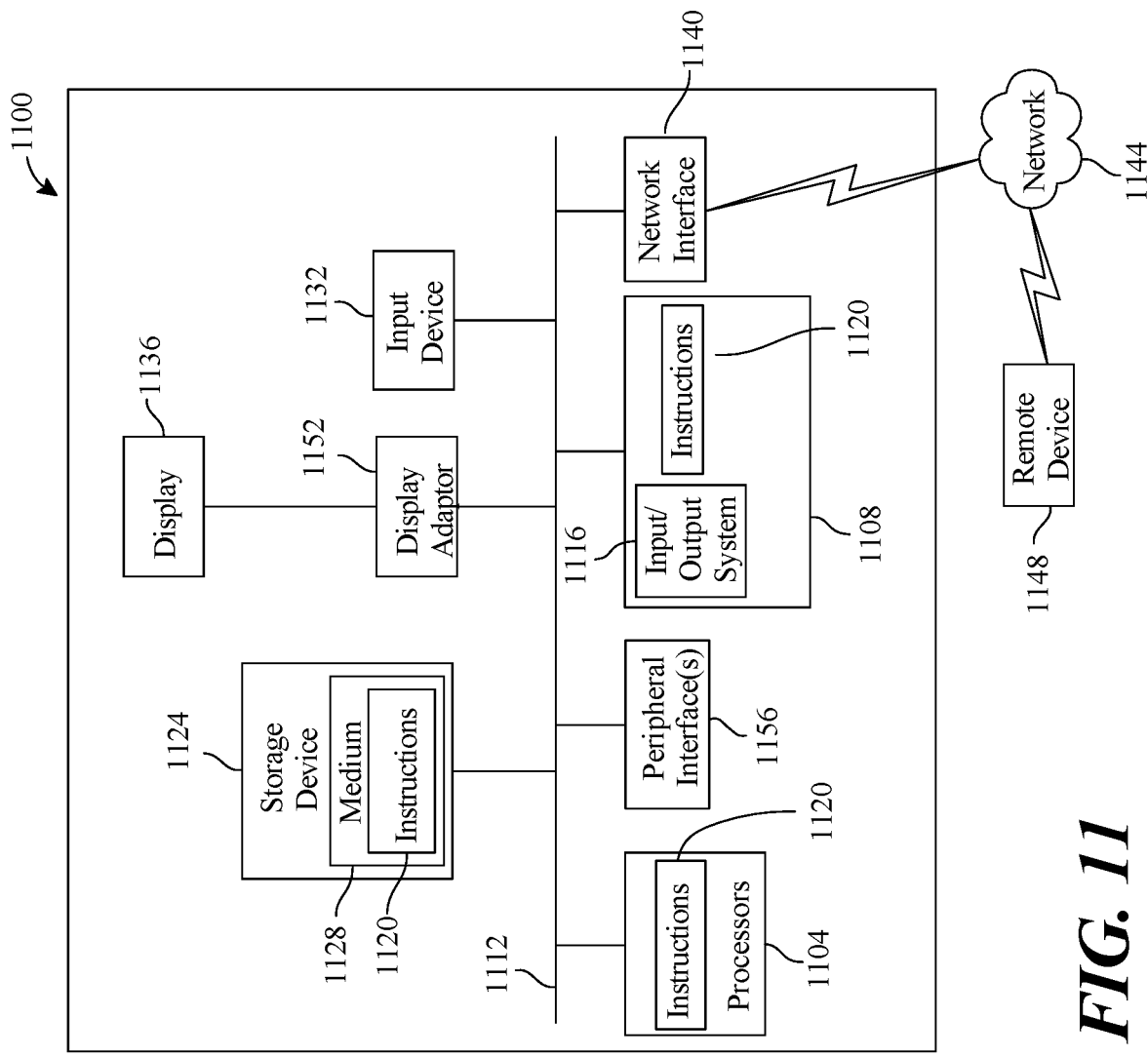
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for charging an electric aircraft including a vertical cable arrangement, the system comprising:
 a charger, wherein the charger comprises:
  an energy source;
  a charging cable, wherein the charging cable is electrically connected to the energy source of the charger;
  a vertical cable arrangement, wherein:
   the vertical cable arrangement comprises at least a length of the charging cable;
   the vertical cable arrangement comprises a cable arrangement wherein the charging cable exits the cable arrangement in an orientation that is substantially perpendicular to a substantially horizontal ground surface;
   the vertical cable arrangement has a first cable arrangement position, wherein the vertical cable arrangement is located at a first elevation; and
   the vertical cable arrangement has a second cable arrangement position, wherein the vertical cable arrangement is located at a second elevation, wherein the second elevation is greater than the first elevation;
  a vertical cable arrangement container, wherein:
   the vertical cable arrangement container encloses at least a portion of the vertical cable arrangement;
   the vertical cable arrangement container includes a cable exit hole; and
   the cable exit hole is configured such that, when the charging cable exits the cable exit hole, the charging cable exits the charging cable hole in an orientation substantially perpendicular to the substantially horizontal ground surface; and
  a lift, wherein:
   the lift is connected to the vertical cable arrangement; and
   the lift has a first lift position and a second lift position, wherein:
    when the lift is in the first lift position, the vertical cable arrangement is in the first cable arrangement position; and
    when the lift is in the second lift position, the vertical cable arrangement is in the second cable arrangement position.

2. The system of claim 1, wherein the lift includes a pneumatic elevator.

3. The system of claim 1, wherein the lift includes a hydraulic elevator.

4. The system of claim 1, further comprising a helipad, wherein:
 the charger is disposed on the helipad; and
 the helipad comprises a landing surface, wherein:
  the landing surface is a substantially horizontal, planar surface; and
  the landing surface is configured to accommodate an electric aircraft.

5. The system of claim 4, wherein the first elevation of the first cable arrangement position of the vertical cable arrangement is below a landing surface elevation of the landing surface.

6. The system of claim 5, wherein the second elevation of the second cable arrangement position of the vertical cable arrangement is above the landing surface elevation of the landing surface.

7. The system of claim 1, further comprising a controller, the controller configured to send a lift raising signal to the lift, wherein the lift raising signal causes the lift to move from the first lift position to the second lift position.

8. The system of claim 7, wherein the controller is further configured to send a lift lowering signal to the lift, wherein the lift lowering signal causes the lift to move from the second lift position to the first lift position.

9. The system of claim 1, wherein, the charger further comprises a charger base, wherein:
 the charger base comprises the energy source;
 the charger base is connected to the vertical cable arrangement; and
 the charger base is in a fixed position regardless of the position of the lift.

10. The system of claim 1, wherein the vertical cable arrangement further comprises a cable reel, wherein:
 the cable reel is rotatably mounted to the charger; and
 the charging cable, in a stowed configuration, is wound around the cable reel.

11. The system of claim 10, wherein the vertical cable arrangement further comprises a rotator, the rotator configured to rotate the cable reel in a forward direction and a reverse direction.

12. The system of claim 11, further comprising a rotation toggle, wherein:
 the rotation toggle is configured to:
  send a forward rotation toggle signal to a controller; and
  send a reverse rotation toggle signal to the controller; and
 the controller is configured to:
  send a forward rotation signal to the rotator in response to receiving a forward rotation toggle signal, wherein the forward rotation signal causes the rotator to rotate in the forward direction; and
  send a reverse rotation signal to the rotator in response to receiving a reverse rotation toggle signal, wherein the reverse rotation signal causes the rotator to rotate in the reverse direction.

13. The system of claim 1, wherein the charger comprises a cable exit hole, wherein the charging cable exits the cable exit hole substantially perpendicular to the ground.

14. A method for charging an electric aircraft including a vertical cable arrangement, the method comprising:
 raising, using a lift, a vertical cable arrangement from a first cable arrangement position to a second cable arrangement position, wherein:
  a second elevation of the second cable arrangement position is greater than a first elevation of a first cable arrangement position;
  the vertical cable arrangement comprises at least a length of a charging cable, wherein the charging cable is electrically connected to a charger comprising an energy source, wherein the vertical cable arrangement comprises a cable arrangement wherein the charging cable exits the cable arrangement in an orientation that is substantially perpendicular to a substantially horizontal ground surface;

enclosing, at least a portion of the vertical cable arrangement, in a vertical cable arrangement container, wherein:
the vertical cable arrangement container includes a cable exit hole; and
the cable exit hole is configured such that, when the charging cable exits the cable exit hole, the charging cable exits the charging cable hole in an orientation substantially perpendicular to the substantially horizontal ground surface;
unstowing the charging cable such that the charging cable is in an unstowed configuration, wherein:
in a stowed configuration, the charging cable is wound around a cable reel, wherein the cable reel is rotatably mounted to the charger; and
in the unstowed configuration, at least a portion of the charging able is not wound around the cable reel;
coupling a charging connector to a charging port disposed on an electric vehicle, wherein:
the charging connector is electrically connected to the charging cable; and
the charging connector is configured to couple with a corresponding charging port on an electric aircraft;
uncoupling the charging connector from the charging port disposed on the electric vehicle; and
stowing the charging cable such that the charging cable is in the stowed configuration.

15. The method of claim 14, further comprising lowering, using the lift, the vertical cable arrangement from the second cable arrangement position to the first cable arrangement position.

16. The method of claim 14, wherein the first elevation of the first cable arrangement position of the vertical cable arrangement is below a landing surface elevation of a landing surface, wherein:
the landing surface is a substantially horizontal, planar surface that is part of a helipad; and
the landing surface is configured to accommodate an electric aircraft.

17. The method of claim 16, wherein the second elevation of the second cable arrangement position of the vertical cable arrangement is above the landing surface elevation of the landing surface.

18. The method of claim 15, wherein:
raising the vertical cable arrangement from the first cable arrangement position to the second cable arrangement position comprises sending a lift raising signal to the lift, wherein the lift raising signal causes the lift to move from a first lift position to a second lift position; and
lowering the vertical cable arrangement from the second cable arrangement position to the first cable arrangement position comprises sending a lift lowering signal to the lift, wherein the lift lowering signal causes the lift to move from second lift position to a first lift position.

19. The method of claim 14, wherein:
unstowing a charging cable comprises sending a forward rotation signal to a rotator, wherein the forward rotation signal causes the rotator to rotate in a forward direction, wherein:
the rotator is configured to rotate the reel in a forward direction and a reverse direction; and
the rotator is comprised in the vertical cable arrangement; and
stowing the charging cable comprises sending a reverse rotation signal to the rotator, wherein the reverse rotation signal causes the rotator to rotate in a reverse direction.

20. The method of claim 14, wherein the lift includes a hydraulic elevator.

* * * * *